(12) United States Patent
Strobeck (10) Patent No.: US 12,511,671 B1
(45) Date of Patent: Dec. 30, 2025

(54) MONETIZED USER FEEDBACK SYSTEM AND PLATFORM FOR MONETIZING USER FEEDBACK THROUGH CONCISE, TARGETED TIPS AIMED AT DECISION-MAKERS

(71) Applicant: Kirk Larson Strobeck, Beaverton, OR (US)

(72) Inventor: Kirk Larson Strobeck, Beaverton, OR (US)

( * ) Notice: Subject to any disclaimer, the term of this patent is extended or adjusted under 35 U.S.C. 154(b) by 0 days.

(21) Appl. No.: 19/062,710

(22) Filed: Feb. 25, 2025

Related U.S. Application Data (60) Provisional application No. 63/656,110, filed on Jun. 5, 2024.

(51) Int. Cl.
  *G06Q 30/00* (2023.01)
  *G06Q 20/14* (2012.01)
  *G06Q 30/0282* (2023.01)
  *G06Q 30/0601* (2023.01)

(52) U.S. Cl.
  CPC ......... *G06Q 30/0282* (2013.01); *G06Q 20/14* (2013.01); *G06Q 30/0641* (2013.01)

(58) Field of Classification Search
  CPC .............................................. G06Q 30/0282
  See application file for complete search history.

(56) References Cited

U.S. PATENT DOCUMENTS

| 2013/0173365 A1* | 7/2013 | Beighley, Jr. ...... G06Q 30/0214 705/14.16 |
| 2013/0173404 A1* | 7/2013 | Scipioni ............. G06Q 30/0282 705/16 |

OTHER PUBLICATIONS

Wang, Jing, Anindya Ghose, and Panos Ipeirotis. "Bonus, disclosure, and choice: what motivates the creation of high-quality paid reviews?." ICIS. 2012.*

* cited by examiner

*Primary Examiner* — Kathleen Palavecino
(74) *Attorney, Agent, or Firm* — Plager Schack LLP; Mark H. Plager; Stephen Hallberg (57) ABSTRACT

A monetized user feedback system and platform is disclosed. The monetized user feedback system hosts a platform for monetizing user feedback through concise, targeted tips aimed at decision-makers. The monetized user feedback system is configured to provide incentives for high-quality submissions with a ranking-based valuation system that reinforces the authenticity of user feedback. Furthermore, the monetized user feedback system allows for direct interactions between feedback providers and purchasers by autonomously creating feedback channels for businesses and subjects. This means entities do not need to take any proactive steps to establish contact forms or surveys because the platform for the monetized user feedback system does this by integrating various data sources to make all subjects accessible. In this way, the monetized user feedback system streamlines the feedback process and expands the potential for valuable insights without requiring upfront effort from the subjects of feedback.

13 Claims, 6 Drawing Sheets

MONETIZED USER FEEDBACK SYSTEM AND PLATFORM FOR MONETIZING USER FEEDBACK THROUGH CONCISE, TARGETED TIPS AIMED AT DECISION-MAKERS

CLAIM OF BENEFIT TO PRIOR APPLICATION

This application claims benefit to the United States Provisional Patent Application 63/656,110, entitled "MONETIZED USER FEEDBACK SYSTEM AND PLATFORM FOR MONETIZING USER FEEDBACK THROUGH CONCISE, TARGETED TIPS AIMED AT DECISION-MAKERS," filed Jun. 5, 2024. The United States Provisional Patent Application 63/656,110 is incorporated herein by reference.

BACKGROUND

Embodiments of the invention described in this specification generally relate to feedback exchange and monetization systems and, more particularly, to a monetized user feedback system and platform for monetizing user feedback through concise, targeted tips aimed at decision-makers.

Existing systems in the feedback exchange field often lack mechanisms for directly or indirectly monetizing user contributions and fail to effectively surface the most valuable insights to stakeholders. Furthermore, they do not provide a robust framework for anonymous submissions alongside incentivized, transparent user engagement, resulting in less actionable feedback and reduced motivation for users to contribute high-quality insights.

Therefore, what is needed is a way to address a key issue/problem in obtaining valuable, honest feedback in the digital realm by providing a mechanism for facilitating compensated feedback, enabling individuals to monetize their insights, and providing a platform for the exchange of valuable feedback between feedback providers and any interested party, including businesses, organizations, or individuals.

BRIEF DESCRIPTION

A novel monetized user feedback system is disclosed, which addresses a wide-ranging issue in the digital realm by facilitating compensated feedback across various domains, not limited to businesses alone. In some embodiments, the monetized user feedback system hosts a platform for monetizing user feedback through concise, targeted tips aimed at decision-makers. In some embodiments, the monetized user feedback system is configured to provide incentives for high-quality submissions with a ranking-based valuation system that reinforces the authenticity of user feedback. Feedback channels (topics) enable interactions between feedback providers and purchasers. In some embodiments, feedback providers and purchasers can directly communicate through the transaction context. Furthermore, in some embodiments, feedback channels are autonomously created for businesses and subjects. This means entities do not need to take any proactive steps to establish contact forms or surveys because the platform for the monetized user feedback system does this by integrating various data sources to make all subjects accessible. In this way, the monetized user feedback system streamlines the feedback process and expands the potential for valuable insights without requiring upfront effort from the subjects of feedback.

The preceding Summary is intended to serve as a brief introduction to some embodiments of the invention. It is not meant to be an introduction or overview of all inventive subject matter disclosed in this specification. The following Detailed Description and the Drawings in the Detailed Description will further describe the Summary embodiments and others. Accordingly, a full review of the Summary, Detailed Description, and Drawings is needed to understand all the embodiments described in this document. Moreover, the claimed subject matters are not to be limited by the illustrative details in the Summary, Detailed Description, and Drawings but rather are to be defined by the appended claims because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

The following detailed invention description includes numerous details, examples, and embodiments. However, it will be apparent to one skilled in the art that the invention is not limited to the embodiments set forth and can be adapted for many applications.

Embodiments of the invention described in this specification include a novel monetized user feedback system. The monetized user feedback system provides an effective mechanism for honest, compensated feedback across numerous domains, businesses, etc. To do so, the monetized user feedback system hosts a platform for monetizing user feedback through targeted tips aimed at decision-makers. The monetized user feedback system is configured to allow for rich media handling of user feedback ('tips') including, without limitation, written/textual tips, video tips, audio tips, images, documents, access to other resources, code, virtual reality tips ('VR tip objects' added to or posted for a corresponding VR entity, such as a business in a VR environment), augmented reality tips ('AR tip objects' added by a user when in a physical location of a place of business, point of interest, or other entity (topic)), other types of virtual tips that digitally submit tip details to the backend system through the associated virtualized interface (which is akin to placing sticky notes on physical objects in the real world), and combinations of different types of media. Furthermore, tips may be submitted as concise tips targeted in scope and may be verbose and wide-ranging, such that tips may be nearly unlimited in length, complexity, and media types. Accordingly, while the present disclosure refers to several examples of concise, targeted tips in text media form, it is noted here that the monetized user feedback system fully supports all such feedback media formats, whether concise and targeted or verbose and expansive.

In some embodiments, the monetized user feedback system is configured to provide incentives for high-quality submissions with a ranking-based valuation system that reinforces the authenticity, honesty, and quality or value of user feedback submissions. Feedback channels (topics) enable interactions between feedback providers and purchasers. In some embodiments, feedback providers and purchasers can directly communicate through the transaction context. Furthermore, in some embodiments, feedback channels are autonomously created for businesses and subjects. This means entities do not need to take any proactive steps to establish contact forms or surveys because the platform for the monetized user feedback system does this by integrating various data sources to make all subjects accessible. In this way, the monetized user feedback system streamlines the feedback process and expands the potential for valuable insights without requiring upfront effort from the subjects of feedback.

In some embodiments, the monetized user feedback system enables individuals to monetize their insights. It provides a platform for exchanging valuable feedback between feedback providers and any interested party, including businesses, organizations, or individuals. In some embodiments, the monetized user feedback system ensures that insightful feedback is effectively communicated to the relevant stakeholders, regardless of their domain. In some embodiments, the monetized user feedback system also introduces flexibility in feedback submission, allowing contributors to choose between anonymity and self-attribution, with options for direct communication. In some embodiments, the monetized user feedback system further resolves the challenge of pre-purchase valuation, enabling potential acquirers to assess the worth of insights before making a financial commitment. By addressing the bottleneck in feedback review processes, the monetized user feedback system ensures that feedback reaches the intended recipients promptly and efficiently. Lastly, the monetized user feedback system solves the critical issue of establishing a feedback channel (topic), making it accessible and beneficial for businesses and anyone seeking valuable insights, thereby broadening the scope of feedback monetization and utilization beyond the corporate sphere.

As stated above, existing systems in the feedback exchange field often lack mechanisms for directly or indirectly monetizing user contributions and fail to effectively surface the most valuable insights to stakeholders. Furthermore, they do not provide a robust framework for anonymous submissions alongside incentivized, transparent user engagement, resulting in less actionable feedback and reduced motivation for users to contribute high-quality insights. Embodiments of the monetized user feedback system described in this specification solve such problems by a hosted, API-driven platform configured to enable user feedback submissions to recipients. Furthermore, the monetized user feedback system solves several other problems, including (i) ensuring that insightful feedback is effectively communicated to the relevant stakeholders, regardless of their domain, (ii) introducing flexibility in feedback submission, (iii) allowing contributors to choose between anonymity and self-attribution, with options for direct communication, and (iv) resolving the challenge of pre-purchase feedback valuation, enabling potential acquirers to assess the worth of insights before making a financial commitment. By addressing the bottleneck in feedback review processes, the monetized user feedback system ensures that tips reach the intended recipients promptly and efficiently. Lastly, the monetized user feedback system solves the critical issue of establishing a feedback channel (topic), making it accessible and beneficial for businesses and anyone seeking valuable insights, thereby broadening the scope of feedback monetization and utilization beyond the corporate sphere.

In some embodiments, the monetized user feedback system comprises a front-end system (application, mobile app, web app, or any other software) for submitting feedback forms, a back-end system for processing these submissions, and a database for storage.

In some embodiments, the monetized user feedback system enables users to submit feedback (or "tips") on specific feedback channels, otherwise known as topics. As described in this specification, topics are not limited to anything but can refer to nearly anything. Topic examples include, without limitation, physical locations, brands, companies, organizations, websites, mobile apps, license plates, printed literature and advertising, names, individuals, products, services, etc. However, the monetized user feedback system organizes tips according to their topic, shown on their topic detail page. For example, the topic "Joe's coffee shop" may rank and list many submitted tips, as shown on the "Joe's coffee shop" topic detail page in a rank-sorted list. This way, users can discover all tips related to a specific topic and quickly identify the most valuable tips at or near the top of the list. In addition to ranking and listing tips by topic, the monetized user feedback system allows users to follow topics and get notifications about tips posted to their followed topics.

In some embodiments, the monetized user feedback system enables users to submit open-ended or free-form tips. In some embodiments, the monetized user feedback system also allows users to specify anonymity preferences. For instance, users can choose to submit feedback anonymously or with self-attribution. In some embodiments, the monetized user feedback system allows feedback submission with paid or free pricing. For example, a tip can be submitted as free or paid feedback. When submissions are intended as paid content, some embodiments of the monetized user feedback system assign a pre-purchase valuation to each tip based on the submitting user's (tip author's) rank (also known as reputation). In some embodiments, the monetized user feedback system determines each user's rank by community feedback based on the user's prior contributions. This ranking system enables others to assess tips' value before purchase and incentivizes honesty by tip authors whose reputations will follow them. Note, however, that the monetized user feedback system directs tips to interested parties based on lead sources provided by or through tip authors. Since tip authors have a vested interest in getting their tips purchased, authors will be incentivized to add the email addresses of people who may be interested (e.g., a coffee shop manager at "Joe's Coffee Shop" and/or at several other nearby coffee shops). Then, those "recipient users" get an email encouraging them to visit and purchase tips by highlighting the opportunity cost of these insights. Upon purchasing a tip, recipient users can access its content through the platform hosted by the monetized user feedback system. While not required, recipient users may also directly communicate with the author (tip provider). They must complete a post-purchase tip feedback form to continue using the platform, influencing the author's rank. This mechanism ensures the circulation of valued feedback and fosters a community-driven valuation system. Beyond that, the monetized user feedback system is configured to allow users to view free tips and/or purchase paid tips, regardless of who they are and/or how they discovered the tips or topics. Therefore, the monetized user feedback system is not limited to the outreach capabilities of authors alone.

Embodiments of the monetized user feedback system described in this specification differ from and improve upon currently existing options. In particular, the existing devices or systems fall short because they do not adequately incentivize high-quality feedback submission nor accurately assess the value of feedback before it is accessed. Additionally, the lack of direct communication between feedback providers and recipients diminishes the potential for constructive dialogue and actionable insights, limiting the overall effectiveness and impact of the feedback exchange process. By contrast, the monetized user feedback system described in the present disclosure offers a new way to integrate a user-rank-based pre-purchase valuation system with an option for direct communication between feedback authors and purchasers (recipients), thereby offering a dynamic, community-driven platform that elevates the value and impact of user feedback beyond existing solutions in the field. This approach monetizes constructive feedback, empowers the creator economy, and ensures that the most valuable insights are efficiently surfaced and rewarded, raising the bar for feedback exchange.

Feedback channels (topics) enable interactions between feedback providers and purchasers. In some embodiments, feedback providers and purchasers can directly communicate through the transaction context. Furthermore, in some embodiments, feedback channels are autonomously created for businesses and subjects. Consequently, entities do not need to take any proactive steps to establish contact forms or surveys since the monetized user feedback system provides this fully through the platform by integrating various data sources. In this way, the monetized user feedback system streamlines the feedback process and expands the potential for valuable insights without requiring upfront effort from the subjects of feedback.

The monetized user feedback system of the present disclosure provides a streamlined experience governed by a set of definitions and rules for both tip authors and tip purchasers to ensure clarity, usability, and value for all platform users. Specifically, the monetized user feedback system may comprise the following elements. This list of possible constituent elements is intended to be exemplary only, and it is not intended that this list be used to limit the monetized user feedback system of the present application to just these elements. Persons with ordinary skills in the art relevant to the present disclosure may understand that equivalent elements may be substituted within the present disclosure without changing the essential function or operation of the monetized user feedback system.

1. A user registration and grants user interface (UI) of a software implementation for the platform (visibly output to users connected to a front-end system of the platform and communicably connected to a backend server system (or "cloud server") that hosts a cloud application service for the monetized user feedback system).

2. A content creation UI for registered users, with content creation tools made available from the backend server system.

3. A monetization and access control system for the backend server that is communicably connected to a payment gateway system (either the platform or a third-party payment gateway system).

4. A data management system of the backend server. The data management system is communicably connected to one or more data storage/databases.

5. An earnings distribution and reputation system of the monetized user feedback system.

6. A topic management system of the monetized user feedback system with channels for communication between authors and purchasers.

7. A content ranking system and visibility manager.

The set of definitions and rules organizes the operational aspects of the monetized user feedback system. Next, we describe these operational aspects using FIGS. 1-4.

Figure 1:
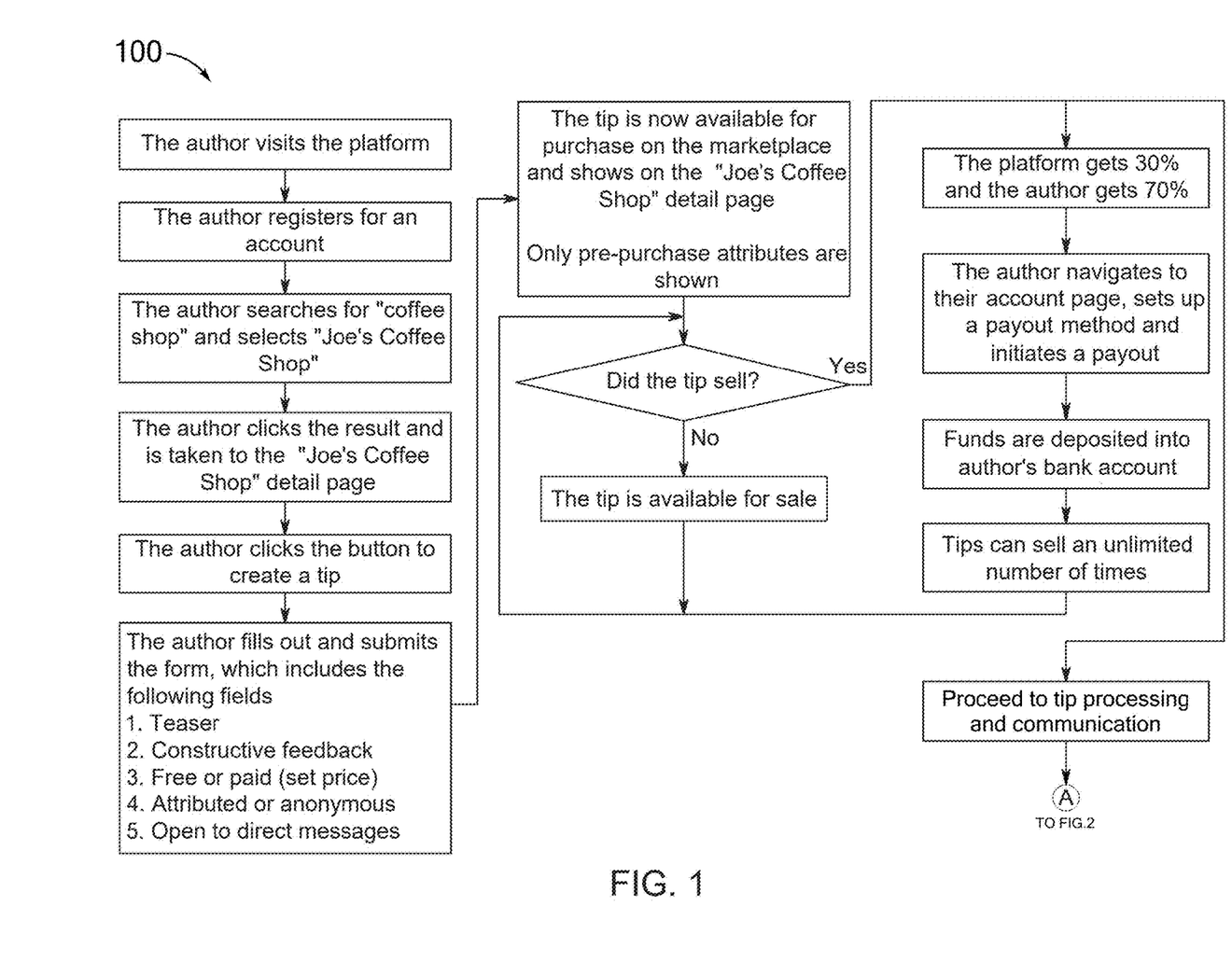
FIG. 1 conceptually illustrates a tip author method for creating and posting a tip on a tip marketplace in some embodiments.

Specifically, FIG. 1 conceptually illustrates a tip author method 100 for creating and posting a tip on a tip marketplace. This figure shows that the tip author method 100 starts when an author (or "user") visits the platform. All authors and purchasers need to register on the platform. Thus, if the author is unregistered, the author navigates to a registration view to register for an account. Once registered, the author may seek to leave a tip on a specific topic, such as a coffee shop. The topic in this example is "Joe's Coffee Shop." Thus, when the author searches for "coffee shop," one or more coffee shop topics may appear in the search results view in the tip marketplace. In this example, the search results would list "Joe's Coffee Shop" as one of the coffee shops found during the search. Thus, the author may select the "Joe's Coffee Shop" topic detail page to create a new tip with feedback about "Joe's Coffee Shop."

Once selected, the author is taken to the "Joe's Coffee Shop" topic detail page. On the topic detail page, the author selects the button to create a tip and enters the requested information in the form. The information may be filled out in fields labeled as "Teaser," "Constructive feedback," "Free or paid," in which the author would set a price to purchase the tip if paid, "Attributed or anonymous," and "Open to direct messages" or not. While these form fields may be utilized in a preferred embodiment, a person of ordinary skill would understand that aside from "Constructive feedback" and feedback-related user-added content inputs, like media uploads, all fields mentioned are optional given the implementation specifics, including its interface, platform expectations, and defaults (for example, a fixed-price implementation would not need pricing fields). After the author fills in all required fields (or makes selections of free/paid (and sets a price when 'paid'), open/not open to direct messages), then the author-provided information is saved for the new tip (persistently stored) and is added to the tip marketplace, showing up on the "Joe's Coffee Shop" topic detail page. The system automatically sets a pre-purchase view of the new tip, with only limited attributes displayed (e.g., showing the teaser but not the constructive feedback). In this way, only the purchasing user would see the post-purchase view with additional attributes (e.g., show the constructive feedback field(s)) displayed.

Thus, the tip author method 100 proceeds to a step for determining whether the new tip created by the author has been sold. Whether or not the tip has not been sold, it remains available on the tip marketplace, and the tip author method 100 returns to determine whether the tip has been sold. When the tip is sold to a tip purchaser, the tip author method 100 proceeds along two contemporaneous steps, with a first line involving the earnings split percentage configured for the platform. Specifically, the earnings split percentage provides a breakdown of the purchase amount for the tip-meaning the amount or percentage apportioned to the platform and the amount or percentage apportioned to the tip author. This figure provides the example of a split percentage breakdown in which the platform gets thirty percent of the price while the author receives seventy percent of the cost. While this breakdown may be utilized in a preferred embodiment, a person of ordinary skill would understand that different percentage breakdowns can be configured to distribute the prices paid to purchase tips posted to the tip marketplace.

Next, in the first line of steps, the author navigates to their account page (since they are already registered) and sets up a payout method. Once this is done, the author initiates the payout. This triggers the platform to deposit the percentage of the price designated for the author to a bank account or other deposit account set by the author. The percentage amount specified to the platform is also deposited into the platform's account. While this initial tip purchase may provide funds, as noted above, the tip itself remains active and present on the tip marketplace. This is because tips can sell more than once on the platform. Specifically, tips can be sold any number of times without limit. Thus, the tip author method 100 returns to the step for determining whether the tip has sold (e.g., to another tip purchaser).

A second line of steps in the tip author method 100 is performed contemporaneously with the first line of steps described above. Thus, after the determination is made that the tip has sold, the second line of steps proceeds through reference marker "A" in FIG. 1 to several steps for tip processing and communication, described next, by reference to FIG. 2.

Figure 2:
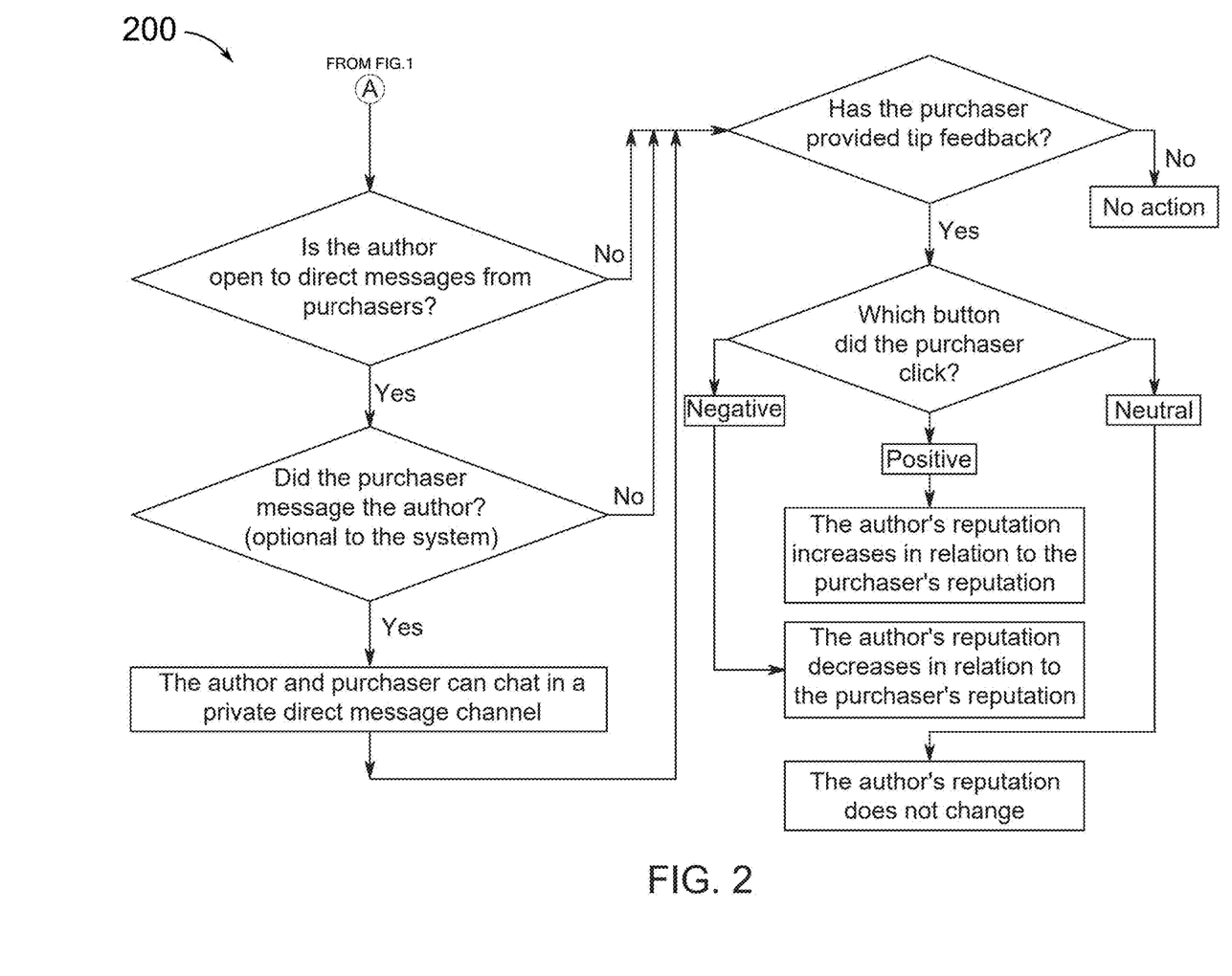
FIG. 2 conceptually illustrates a post-purchase communication and feedback method for communication and feedback processing after a purchaser buys the tip on the tip marketplace in some embodiments.

Specifically, FIG. 2 conceptually illustrates a post-purchase communication and feedback method 200 for communication and feedback processing after a purchaser buys the tip on the tip marketplace. As shown in this figure, tip processing flows through reference marker "A" to determine whether the tip author is open to direct messages from tip purchasers. This is determined by checking the information set by the author in the tip field for open/not open to direct messages. When the tip author is open to direct messages, the post-purchase communication and feedback method 200 proceeds to a step for determining whether the tip purchaser has initiated a direct message to the tip author or not. In some embodiments, the platform's direct user communications system supports direct messaging channels. The direct messaging channel may then be utilized between the tip author and purchaser to communicate directly and in real-time. An example of a direct user communications system is described below, by reference to FIG. 5. The direct messaging channel is built-in; therefore, direct messaging takes place within the built-in messaging platform. Beneficially, this ensures that users can maintain anonymity and constrain the basis of the conversation to the tip-specific context at hand.

Additionally, from reference marker "A," the post-purchase communication and feedback method 200 determines whether the tip purchaser has provided tip feedback. Tip feedback reflects the perceived value, including quality and/or accuracy, of the information in the tip created and posted by the tip author. Thus, it is tracked to manage tip authors' reputation, which impacts their tip ranking across topics. This ensures system integrity, wherein tip authors are incentivized to provide valuable, accurate, and honest tips.

The post-purchase communication and feedback method 200 transitions to a step for determining whether the tip purchaser has provided tip feedback or not. As noted above, tip purchasers must provide tip feedback to create or purchase more tips from the tip marketplace. The tip feedback is tracked, and this information is stored in a tip feedback database, described in further detail below by reference to FIG. 5. Thus, the post-purchase communication and feedback method 200 does not act until the tip purchaser provides feedback on the tip. On the other hand, when the purchaser affirmatively does provide tip feedback, the platform needs to determine the type of feedback, which is determined based on the feedback button selected by the tip purchaser. The example provides negative, positive, or neutral feedback in this figure. Thus, if the tip purchaser selects the negative feedback button, the tip author's reputation (score) decreases in relation to the purchaser's reputation. However, if the tip purchaser selects the positive feedback button, the tip author's reputation increases in relation to the purchaser's reputation. Finally, if the tip purchaser selects the neutral feedback button, the tip author's reputation does not change. Therefore, a user's reputation (score) is meaningful as an author and purchaser.

The operational aspects laid out by the tip author method 100 and the post-purchase communication and feedback method 200 demonstrate exemplary steps for processing tips provided by tip authors. Another aspect of the platform involves processing operational details regarding tip purchases. This is described next, referring to FIGS. 3-4.

Figure 3:
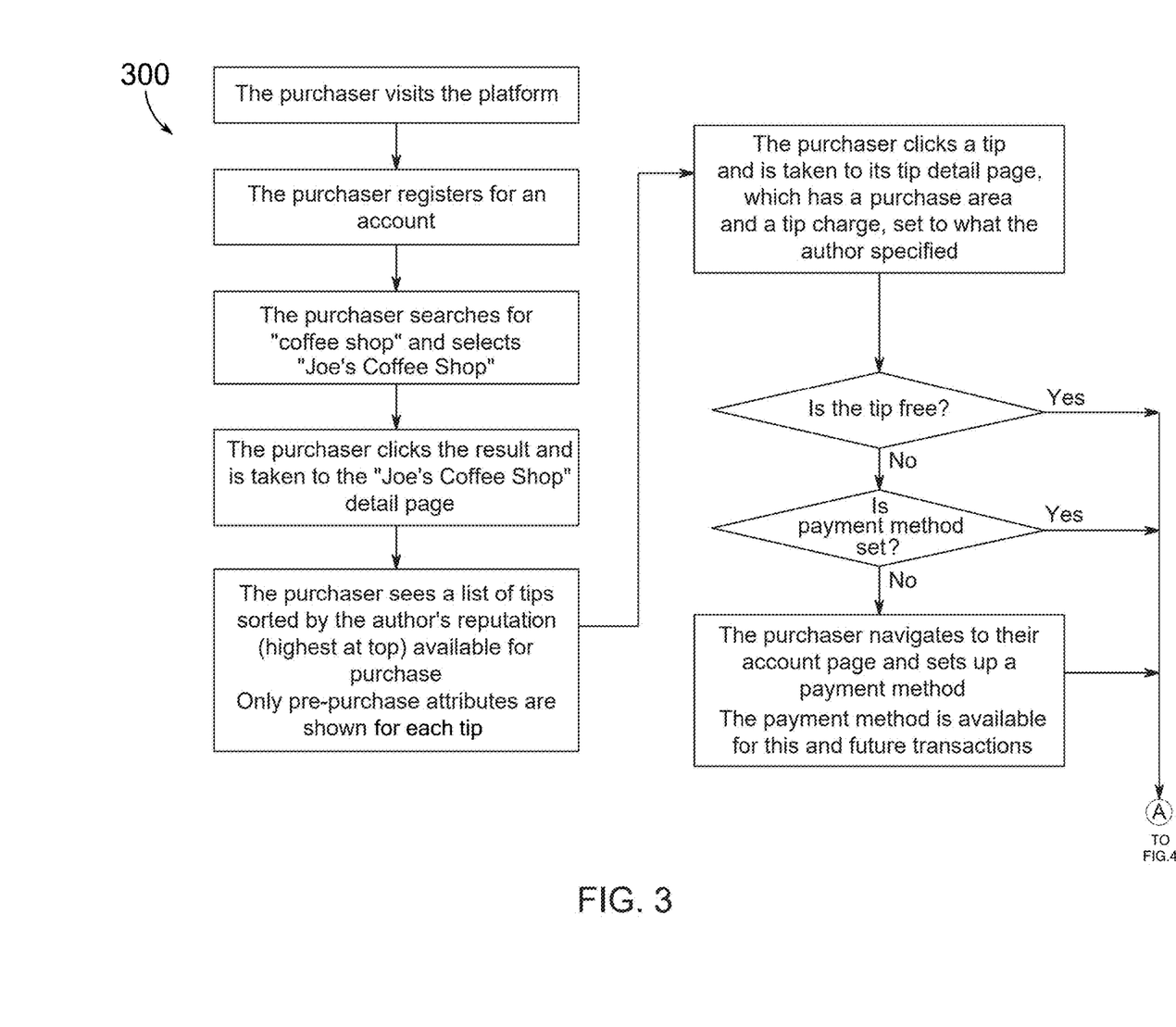
FIG. 3 conceptually illustrates a tip marketplace viewing method for a tip purchaser to view tips posted on the tip marketplace in some embodiments.

Turning first to FIG. 3, a tip marketplace viewing method 300 is conceptually illustrated in which a tip purchaser can view tips posted on the tip marketplace. The tip marketplace viewing method 300 starts when the tip purchaser visits the platform. An example of how any user (tip purchaser, tip author, or both) visits the platform is described below by reference to FIG. 5. Once the tip purchaser is on the platform, they either log into it with their registered credentials or register for an account. When the purchaser is a registered user, the purchaser can proceed to the next step of the tip marketplace viewing method 300.

Specifically, the tip purchaser user searches for a business or entity, such as a "coffee shop", selecting a matching shop (in this example, "Joe's Coffee Shop"). Then, the purchaser clicks the listing for "Joe's Coffee Shop" and is taken to the detail page where the purchaser can see a list of available tips. The list of tips is shown on the detail page in a sorted order. Specifically, the list of tips is sorted by the author's reputation, from highest to lowest. As this list of tips is available, only pre-purchase attributes are shown, such as the "Teaser" description, but not all the in-depth details for each tip.

Next, the tip marketplace viewing method 300 proceeds to a step at which the purchaser selects a particular tip in the list and is taken to the tip detail page. In particular, the tip detail page has a purchase area indicating a tip charge set to the amount specified by the tip author. The tip marketplace viewing method 300 proceeds to the next step for determining whether the tip is free. If the tip is free, no money must be deducted for the purchaser to 'buy' the tip. In that case, the tip marketplace viewing method 300 proceeds to several 'purchase' steps in FIG. 4 (as described below) through reference marker "A" of FIG. 3.

On the other hand, when the tip is not free, the tip marketplace viewing method 300 proceeds to the next step for determining whether the tip purchaser already has a set of payment methods. For instance, the payment method may be set to a primary (or preferred) payment method, such as a credit card or bank account. Alternatively, the tip purchaser may have set up the primary payment method as a cryptocurrency or another form of digital remuneration. Thus, when the tip is not free, and the tip purchaser has affirmatively established their preferred payment method, the tip marketplace viewing method 300 proceeds to the several 'purchase' steps in FIG. 4 (as described below) through reference marker "A" of FIG. 3. However, when the tip purchaser has not set up a payment method, the tip marketplace viewing method 300 continues to a step at which the purchaser navigates to their account page and sets the payment method of choice. This would allow the payment method to be used for current transactions and future tip purchases on the platform. After setting up the payment method, the tip marketplace viewing method 300 proceeds to the several 'purchase' steps in FIG. 4 (as described below) through reference marker "A" of FIG. 3, which is described next.

Figure 4:
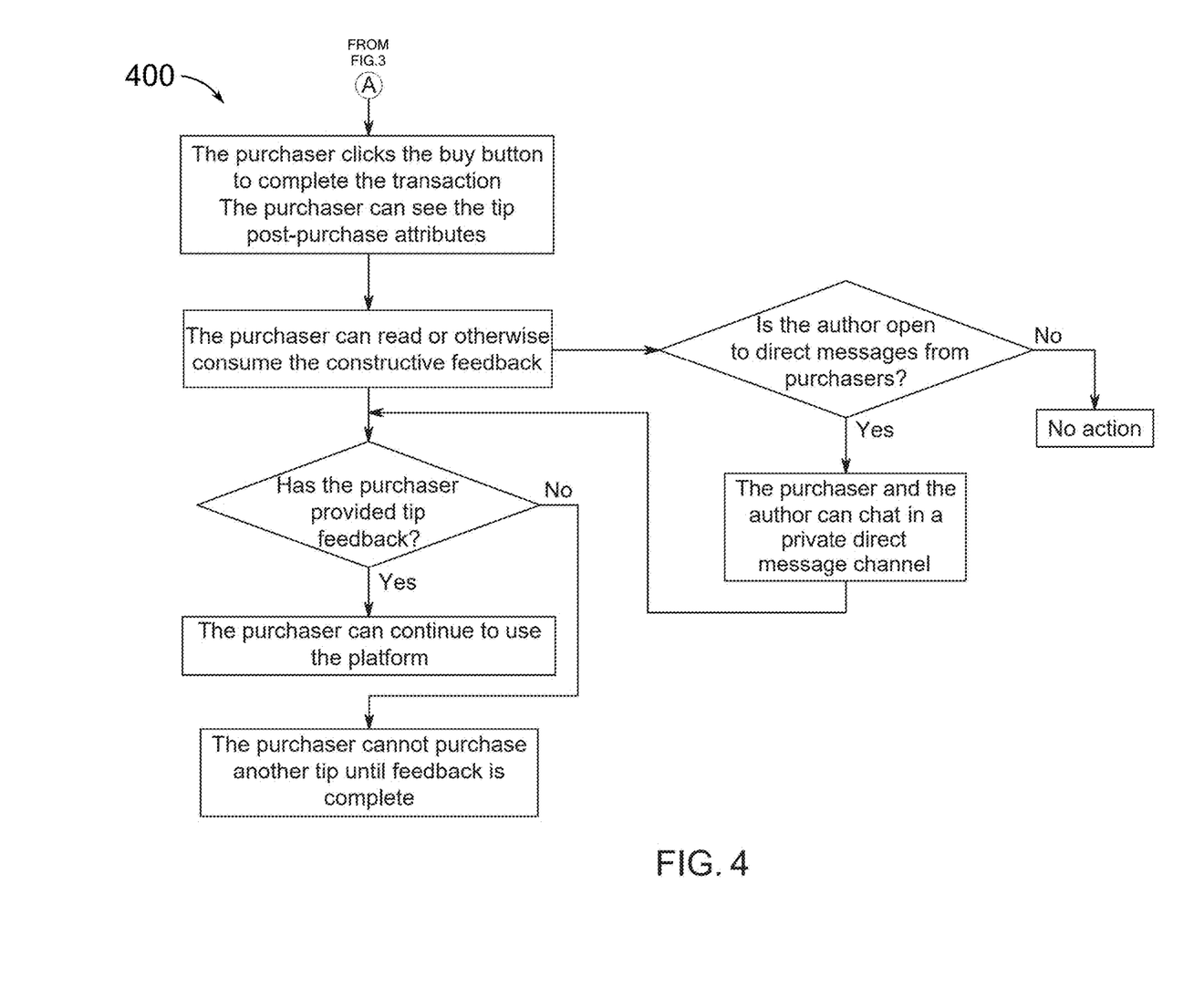
FIG. 4 conceptually illustrates a tip purchase method in which the purchaser purchases a tip from the tip marketplace, performs post-purchase tip feedback, and, in some embodiments, optionally directly communicates with the tip author according to the author's tip-specific settings.

Specifically, FIG. 4 conceptually illustrates a tip buying and post-purchase method 400 for the tip purchaser to purchase a tip from the tip marketplace and perform post-purchase processing for tip feedback and communication between the tip purchaser and the tip author. As shown in this figure, the tip buying and post-purchase method 400 starts with the purchaser selecting/clicking a buy button to complete the transaction for the tip purchase. This is only possible if the purchaser has provided a payment method or when the tip is free (the purchase being for no amount of fiat currency funds/cryptocurrency funds). Note that the tip's funds for payment (whether fiat currency or cryptocurrency funds) may be processed through the platform's payment gateway. The payment gateway may be an integrated system of the platform or a third-party payment gateway communicably connected to the platform. An example of a payment gateway integrated into the system is described further below by reference to FIG. 5.

Next, the tip buying and post-purchase method 400 proceeds to a step where the purchaser can view the entire tip details page. This allows the tip purchaser to read or otherwise consume (e.g., watch a 'tip video', listen to a 'tip audio' commentary, etc.) the constructive feedback of the tip.

The tip buying and post-purchase method 400 then proceeds along two contemporaneous sequences of steps, the first sequence of steps involving a determination of whether the tip purchaser has provided tip feedback or not and the second sequence of steps involving a determination of whether the tip author is open to direct communications from the tip purchaser or not. For the first sequence of steps, the tip buying and post-purchase method 400 determines whether the tip purchaser has provided tip feedback. When the tip purchaser has affirmatively provided feedback ('YES'), then the tip buying and post-purchase method 400 proceeds to a step at which the tip feedback is tracked (stored), and the purchaser can continue to use the platform. On the other hand, when the tip purchaser has not provided feedback ('NO'), the tip buying and post-purchase method 400 proceeds to a different step at which the purchaser is prevented from creating or purchasing any other tips until they provide tip feedback on the presently purchased tip.

For the second sequence of steps, when the tip author is not open to direct communication, the tip buying and post-purchase method 400 takes no action. However, when the tip author is open to direct communications, the tip buying and post-purchase method 400 proceeds to a step at which the tip purchaser and the tip author are connected to chat over a transaction-context-specific private direct message channel, such as is described above, by reference to FIG. 2, or supported by way of a direct user communications system, such as is described further below, by reference to FIG. 5. Then, the tip buying and post-purchase method 400 returns to the step for determining whether the tip purchaser has provided tip feedback.

Notably, tip creators/providers and purchasers are not specific, differentiated roles but relate to platform users engaged in various activities at any given time. Thus, when reference is made to tip creators, providers, and/or tip purchasers, the underlying user is engaged in activities or operations corresponding to those of a creator or purchaser. That same user may later engage, or previously have engaged, in activities of the other. Thus, in the examples described above by reference to FIGS. 1-4, both tip creators/providers/authors and tip purchasers/buyers are involved in their respective actions through the platform in a way that demonstrates key foundational aspects of how the monetized user feedback system and platform works in practice to ensure that feedback authors provide accurate and honest tips and that tip purchasers trust the information being relayed in any particular tip they purchase. This is accomplished in different ways, for example, through a reputation/ranking system, through user registration requirements, and/or through a flexible system that allows tip authors to set their preferred attribution when they create tips (that is, allowing fully disclosed username as "attributed" or making the new tip "anonymous"). Other aspects of flexibility are inherent in the architecture of the monetized user feedback system, as described next.

In particular, the monetized user feedback system and platform may be deployed to enable seamless operation regardless of users' location. For example, a cloud-based network architecture can be utilized to deploy the monetized user feedback system and platform. As a cloud-based network platform, the monetized user feedback system and platform are designed to facilitate the sharing and consumption of knowledge through user-generated tips/feedback no matter the location of any given user. For example, a tip author may be walking along a sidewalk and observe a business that lists outdated hours of operation at an entryway and, therefore, decides to author a new tip concerning this oversight. However, the tip author may live in another area and be visiting the location only temporarily and, therefore, may wait to provide the tip later, even when back home. In terms of the value added, the tip may be valuable to the business owner no matter who the author is or even if the author is from out of town and just visiting the location. Thus, in addition to leveraging a blend of reputation management, access control mechanisms, flexible attribution mechanism (attributed or anonymous tip creation), and content monetization, the monetized user feedback system and platform extends the boundaries of valuable content generation beyond that which can be provided only in local scenarios. While a detailed example of a network architecture that supports this as a cloud-based monetized user feedback system and platform is described further below, by reference to FIG. 5, a breakdown of the core components and functionalities of the monetized user feedback system and platform is listed next, with detailed descriptions of the various components and their functional aspects.

1. User Registration and Grants: Upon joining the platform hosted by the monetized user feedback system, users are endowed with initial reputation points to foster immediate engagement. The monetized user feedback system incentivizes content consumption and creation from the outset.

2. Content Creation: Users can generate tips, specify a teaser, set a price (free or paid), select an attribution method (anonymous or attributed), and craft the tip content. Additional options, settings, and ways for adding rich content, like audio, video, document/file upload, VR tips, AR tips, other virtualized tips, etc., are also available to the users engaged in content creation. Consequently, this approach accommodates a wide range of content types and creator preferences, enriching the platform's informational diversity and extensibility.

3. Monetization and Access Control: The platform hosted by the monetized user feedback system integrates a payment system for paid tips, supportive of different payment forms (such as bank transfer or credit card-based fiat currency payments, cryptocurrency payments, other forms of digital remuneration, etc.) and for accessing content (but which is not required for operation). This open-ended payment model supports various user engagement strategies in which monetary transactions for premium content and broader content access are enabled. Overall, this enhances platform participation.

4. Data Management: Tips are stored with their associated metadata and/or rich media content (e.g., audio content, video content, uploaded documents/files, VR tips, AR tips, other virtualized tips, etc.) in a scalable database that is communicably connected to the platform of the monetized user feedback system. For example, a cloud database can store feedback/tip content, associated metadata, and other things like user accounts, payment details, etc. Then, through the database, the monetized user feedback system can ensure efficient data retrieval and provide a seamless user experience in content discovery and access.

5. Earnings Distribution and Reputation System: The earnings split mechanism of the monetized user feedback system rewards content creators. Additionally, a reputation system of the monetized user feedback system ensures content quality based on user feedback. Feedback options may be limited in certain configurations to a set of options (e.g., positive, negative, neutral). However, as described above, user feedback may be different or more complex than just three options (positive, negative, and neutral). It can be provided in various forms, and the model can still work. For example, some embodiments could implement user-selectable graphical buttons that are defined to have an explicit reputation impact that is specific and unambiguous (that is, not subject to interpretation, as may be the case of free-form feedback mechanisms) whether providing a three-option feedback mechanism confined to selectable options for positive, negative, neutral, or providing a more expansive, different feedback mechanism, the honesty and quality of feedback is a key aspect in support of the reputation system since it may directly influence a creator's reputation.

6. Direct Messaging: Optionally, the monetized user feedback system supports direct messaging between tip authors and purchasers/consumers based on tip-specific author preferences and settings. This facilitates deeper interaction, allowing feedback, discussions, and enhanced community building.

7. Content Ranking and Visibility: Reputation scores influence content ranking in search and discovery algorithms run within the monetized user feedback system. This prioritizes high-quality content and creators with positive community feedback, maintaining content integrity and value.

These components create a self-regulating ecosystem for the monetized user feedback system and platform. This ecosystem balances content creation, monetization, and consumption and is driven by community engagement and quality control.

In some embodiments, the monetized user feedback system and platform are designed to be intuitive for users familiar with digital content platforms, requiring no specialized knowledge beyond general proficiency in web navigation and content management systems. The following is an exemplary series of steps for using and interacting with the monetized user feedback system and platform:

1. Prompt users to log in or register, gathering details for new registrations and providing for new registration reputation grants. Each new user, for example, receives a reputation grant of one thousand ('1000'), subject to change. The user registration details and the reputation grant data are stored in a database, such as a user profile database, described below in FIG. 5. Note, however, that a person of ordinary skill in the art would appreciate that different reputation grant amounts could be configured for new user registrations.

2. Users (authors) create tips by providing a teaser, setting a price, choosing an attribution method (anonymous or attributed), and composing the tip body (constructive feedback). Users may select other options, settings, and/or tools that support different ways of adding rich content, including, without limitation, audio content, video document, document/file-based content (via creation and/or upload tools, etc.), VR tips (via VR goggles in a virtualized world/environment), AR tips (via AR goggles or smartphone, etc.

3. The payment system is integrated for the purchase of tips priced above zero, but for consistency, tracking for free tips may be processed as purchases for no amount of money (that is, the amount being zero). An example of a third-party payment gateway integrated into the platform is described below in FIG. 5. The payment system itself may be configured to process fiat currency-based transactions (e.g., cash via bank transfer, credit card transactions, etc.) and/or to process cryptocurrency payments or other digital forms of payment.

4. Store tips with their associated metadata and/or rich media content (e.g., audio content, video content, uploaded documents, VR tips, AR tips, etc.) in one or more database(s) with attributes including teaser, price, attribution, and body. For instance, storing tips in a tip information database, such as that described below, by reference to FIG. 5.

5. Determine the earnings split percentage for paid tip transactions, subject to change. For instance, the exemplary earnings split percentage of 30% platform and 70% author described above, according to FIG. 1, demonstrates how the split percentage may be divided. A person of ordinary skill in the art would appreciate the wide range of latitude in configuring this percentage split when deploying and configuring the monetized user feedback system and platform.

6. Display tip teasers to users—this is displayed in the user interface (UI), such as the UI provided in the web app, web browser, and/or mobile app. Upon selection, show the price and offer the option to purchase or access.

7. For paid tips, initiate the payment process (e.g., via the payment gateway system) and grant access post-transaction (e.g., via an authentication system/firewall to ensure access is only provided to a user who is already registered and has submitted the requisite payment, either cash via funds/bank transfer, credit card transactions, cryptocurrency payment, or other forms of fiat currency payment and/or digital payment mechanisms).

9. Grant immediate access to free tips. In some embodiments, the system still tracks this as a tip purchase for no money (e.g., monitoring it in the tip transactions database).

Figure 5:
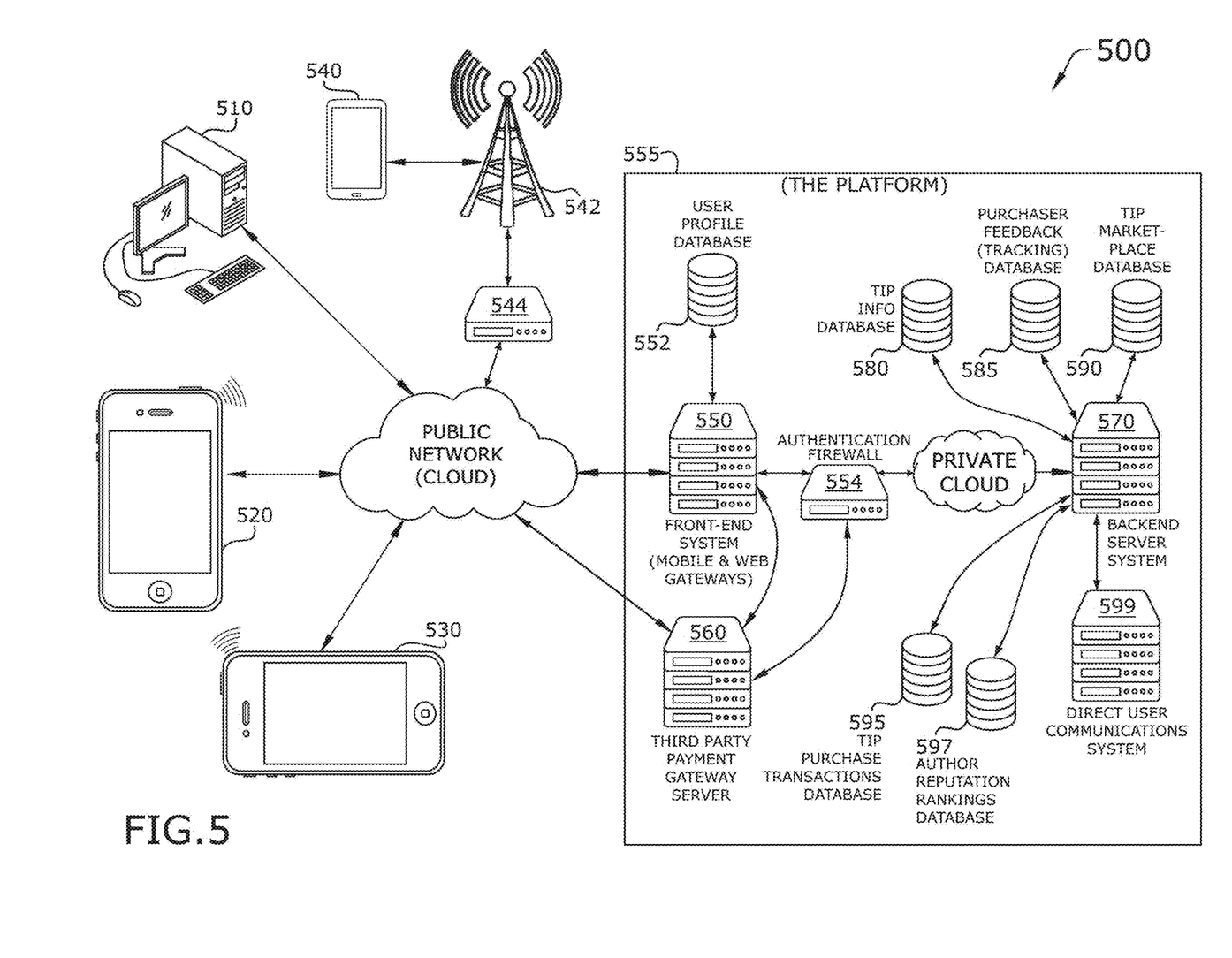
FIG. 5 conceptually illustrates a network architecture of a cloud-based monetized user feedback system and platform in some embodiments.

10. Decide on a tip-specific basis whether to automatically open a direct message channel between the author and purchaser. FIG. 5 provides an example of a direct user communications system.

11. Offer a mixed payment mechanism whereby a tip purchaser can pay for tips with funds sourced from a combination of, for example, a credit card transaction and a cryptocurrency payment. The payment gateway system may be configured to aggregate such mixed purchase options if needed. Similarly, the system may be configured to process payments in one or more fiat currencies from different countries, performing the conversion to a preferred currency, whether in funds transfers from real cash bank account transfers, credit card transactions, cryptocurrencies, or other digital forms of payment, as opposed to requiring the purchase of tips using only one payment mechanism and in only one country.

12. Queue the tip author's earnings for a payout based on the paid tip's price and the earnings split percentage, following their payout schedule. For example, a payment schedule of once per month may require the system to retrieve all payment transactions associated with the tip author over the past month from the tip purchase transactions database (such as that described in FIG. 5).

13. Implement a reputation system where purchasers rate authors with configurable options (e.g., "Was this tip helpful?" with options for selection being yes, no, or neutral, or "How did this tip benefit you?" with options of positively, negatively, or neutral), impacting the author's reputation in relation to the purchaser (e.g., neutral has no impact). To implement the reputation system, a tip author reputation rankings database may store all feedback provided by tip purchasers concerning a tip author. An example of a tip author reputation rankings database is described below in FIG. 5. Notably, the reputation system does not limit such tip purchasers in rating tip authors to selections from a group (e.g., of three options). Still, it would work in any other form for submitting author ratings since author ratings on tips/feedback may be different or more complex than a simple selection from pre-determined options.

14. The reputation system may be configured to influence tip rankings in search and sorting algorithms, which may be implemented in a backend server system. An example of such a system is described below, referring to FIG. 5. In addition to the search and sorting implementations, the backend server system may provide additional tools for user interaction through the UI.

15. Tip authors' reputation scores moderate content priority, enhancing the platform's content quality. The prioritized tip content may be reflected in the tip marketplace, with the platform storing and tracking such information in a database, such as the tip marketplace database, described below by reference to FIG. 5.

16. Overall, the monetized user feedback system ecosystem rewards quality content and feedback, fostering a community of trust and respect driven by dynamic interactions between authors and purchasers.

To make the monetized user feedback system of the present disclosure, a person (or "developer") would (i) build the platform through contemporary web and mobile development frameworks with front-end and back-end services implemented and deployed on hardware resources, such as a web/mobile front-end server, a backend server architecture, and a user interface (UI) that is visually output onto the screens of user devices for access via web site, web app, mobile app, AR/VR headset, and/or other client software, backend server architecture, along with other resources such as database(s), load balancing hardware, encryption, authentication, etc., ensuring compatibility across devices, systems, and browsers, (ii) implement authentication on the platform to ensure privacy and data security, which is completed by integrating a secure authentication system to manage user access and registration, employing encryption for data protection and hardware devices, such as, without limitation, a firewall for preventing unauthorized access to the backend server and other resources available only to registered users, (iii) configure database(s) as relational database(s), NoSQL database(s), and/or other type(s) of database(s) for storing user profiles, tip information with reference to user profiles of tip authors, transactions, feedback, tip marketplace, and author reputation rankings, designing schemata for optimal data storage and retrieval, (iv) perform payment processing by integration of a payment gateway (which may be a third-party payment gateway) to handle financial transactions for paid content, ensuring secure and efficient processing, (v) develop and build in content submission interface for users to create and submit tips, with at least input fields for text (but optionally allowing for image uploads, video recorded tips, audio clips of spoken tips, VR tips, AR tips, etc.), tools or interface elements for selection options for pricing and anonymity, and submission validation, (vi) implement the reputation algorithm in software by designing an algorithm to adjust author reputations based on user feedback, influencing their visibility and ranking on the platform, (vii) build the search and sorting logic in a software implementation with logic to sort and display content based on author reputation and user preferences, enhancing content discoverability, (viii) build and incorporate a direct messaging system with secure messaging for communication between users, with privacy controls and notification systems, (ix) perform quality assurance (QA) by conducting comprehensive testing to ensure functionality, security, and user experience meet design specifications, and (x) deploy the monetized user feedback system and launch the platform hosted by the monetized user feedback system on a scalable cloud infrastructure, providing global access and reliability. An example of the monetized user feedback system that hosts the platform on a scalable cloud infrastructure is described next in FIG. 5.

Specifically, FIG. 5 conceptually illustrates a network architecture of a cloud-based monetized user feedback system 500. As shown in this figure, the cloud-based monetized user feedback system 500 provides a cloud-based platform 555 to which several client-side computing devices access the platform 555 over a public network (such as the Internet, referred to in this figure as the "cloud"), which may involve wired connection or wireless connection (WiFi or cellular connection) over a wireless communication point 542 (e.g., a cell tower for cellular data communication) and by way of a gateway 544 to access the platform 555. The client-side computing devices shown in this figure include a desktop computer 510, a first mobile computing device 520, a second mobile computing device 530, and a tablet computing device 540.

Several systems, resources, and databases are incorporated into platform 555 of the cloud-based monetized user feedback system 500. Specifically, the cloud-based monetized user feedback system 500 and platform 555 include a web/mobile front-end server 550, a user profile database 552, an authentication firewall system 554, a payment gateway server 560, a backend server system 570, a tip information database 580, purchaser feedback (tracking) database 585, a tip marketplace database 590, a tip transaction database 595, a user reputation rankings database 597, and a direct user communications system 599.

In some embodiments, the web/mobile/app front-end server 550 is configured as a public-facing access point for connection by the client-side computing devices. When any client-side computing device connects to the web/mobile/app front-end server 550, the user operating the particular client-side computing device either logs in or registers for an account; this is true whether the user is interfacing with the web/mobile/app front-end server 550 via web browser, web app, or mobile app, AR/VR app, or other client-side software, each of which may be supported by the particular client-side computing device operated by the user for the connection. Accordingly, when the user is new, the authentication firewall 554 of platform 555 prevents access to the backend server system 570 and its algorithms, tools, interfaces, implementations, and data resources. Thus, the new user may register a new account and provide information which is saved as a user profile of the new user. When registration is completed, and all the user profile information is provided, the web/mobile front-end server 550 stores the user profile in the user profile database 552, described next. In some embodiments, the web/mobile front-end server 550 is further configured to perform encryption on one or more data elements of the user profile before storing the user profile in the user profile database 552.

In some embodiments, the user profile database 552 is configured to store each user profile with a unique identifier (UID). In some embodiments, the UID distinguishes each separate user profile from the other user profiles stored in the user profile database 552. In some embodiments, the UID comprises a passcode, a passphrase, a password, a unique numerical value, a hash-encrypted UID name value of the user's name, or a hash-encrypted UID all-data value of all information provided by the specific user. In some embodiments, the hash-encrypted UID name value and the hash-encrypted UID all-data value are encrypted by the web/mobile front-end server 550 using a secure encryption scheme. In some embodiments, the secure encryption scheme comprises a symmetric-key and public-key encryption scheme. In some embodiments, the encryption scheme includes Advanced Encryption Standard (AES) encryption. In some embodiments, the encryption scheme comprises Secure Hash Algorithm (SHA) encryption. In some embodiments, the encryption scheme includes other types of secure encryption.

In some embodiments, the authentication firewall system 554 is configured to prevent unauthorized access to the backend server system 570, through which access to backend server tools, tip marketplace data, and interfaces are provided. This figure is demonstrated by a "private cloud" item that partitions the front end from the backend server system 570. Thus, to access the backend server system 570 over the private cloud, the authentication firewall system 554 must successfully authenticate the user. This may be done by the user providing login credentials, which are then authenticated and, if matching, enable access over the private cloud to the backend server system 570. In some embodiments, the authentication firewall system 554 implements the same encryption scheme as the web/mobile/app front-end server 550. In some embodiments, the authentication firewall system 554 is incorporated into the web/mobile/app front-end server 550 and uses the same encryption scheme as the web/mobile/app front-end server 550.

In some embodiments, the payment gateway server 560 is integrated into platform 555 in the front end and is configured to process tip purchase transactions. In some embodiments, the payment gateway server 560 comprises a third-party payment gateway server 560 deployed on and communicably connected to the platform 555. In some embodiments, the payment gateway server 560 is a fully integrated system incorporated into or communicably connected to the web/mobile front-end server 550 (and is, therefore, not truly a payment gateway of a third party). In some embodiments, the third-party payment gateway server 560 is authenticated as a special user account with no access to the backend server system 570 but which is configured to receive payment transaction information by a payment broker architecture supported by the monetized user feedback system 500 and platform 555. In some embodiments, the payment broker architecture is configured to provide messaging between the backend server system 570 and the third-party payment gateway server 560 to ensure the accuracy of payment transactions for tips purchased in the tip marketplace and stored by the backend server system 570, in the tip purchase transaction database 595.

In some embodiments, the backend server system 570 implements algorithms and tools for tip creation, tip viewing, searching, content and tip author ranking and reputation, etc. In some embodiments, the backend server system 570 is accessible to registered and authenticated users. It is configured to enable payment transaction messaging and direct user messaging through the private cloud to the payment gateway server 560 and the users of the client-side computing devices, respectively. In some embodiments, the backend server system 570 is communicably connected to the data stored in the tip information database 580, the purchaser feedback (tracking) database 585, the tip marketplace database 590, the tip purchase transaction database 595, the tip author reputation rankings database 597, and the direct user communications system 599. In some embodiments, the backend server system 570 is also communicably connected, over the private cloud, to the authentication firewall 554, the web/mobile front-end server 550, and the payment gateway server 560.

In some embodiments, the tip information database 580 is connected to the backend server system 570 and is configured to store tips created by tip authors and linked to their user profiles stored in the user profile database 552.

In some embodiments, the purchaser feedback (tracking) database 585 is connected to the backend server system 570. It is configured to store feedback selections and track the feedback provided by tip purchasers concerning the tips they purchase. In some embodiments, the purchaser feedback (tracking) database 585 is further configured to store a value indicating that the tip purchaser has or has not provided feedback for a particular purchased tip. When a tip purchaser has not provided feedback, the cloud-based monetized user feedback system 500 and platform 555 of some embodiments prevent the tip purchaser from accessing-viewing, or buying-any more tips posted to the tip marketplace.

In some embodiments, the tip author reputation rankings database 597 is connected to the backend server system 570 and configured to store reputation rankings for tip authors on platform 555. The reputation rankings are based on feedback provided by tip purchasers. The reputation ranking of each tip author aggregates all input provided by tip purchasers for all tips created by the tip author. It performs a calculation to yield a reputation score. In some embodiments, the reputation score is calculated as the average score of the aggregated feedback provided by tip purchasers of all the tips created by the author. In some embodiments, the backend server system 570 retrieves the reputation scores of all tip authors from the tip author reputation rankings database 597 and performs a ranking algorithm to rank all tip authors according to their respective reputation scores. Thus, the cloud-based monetized user feedback system 500 and platform 555 can prioritize the display of tips from authors with higher reputations over those with relatively lower reputations.

In some embodiments, the tip marketplace database 590 is communicably connected to the backend server system 570 and is configured to store all active tips in the marketplace and their reputation/ranking values, which are associated with the reputations of the tip authors who created the tips. In some embodiments, the cloud-based monetized user feedback system 500 and platform 555 of some embodiments display the active tips in the tip marketplace as ranked tips based on their reputation/ranking values. Furthermore, the cloud-based monetized user feedback system 500 and platform 555 of some embodiments attributes ranked tips when the tip author prefers attribution but maintains the anonymity of any tip in which the tip author specified the anonymous setting. While the cloud-based monetized user feedback system 500 and platform 555 enable tip creation by tip authors, the backend server system 570 is configured to store newly created tips with or without attribution in the tip marketplace database 590. Accordingly, when an active tip is not attributed (is set to anonymous), the backend server system 570 of some embodiments still performs ranking based on the reputation of the tip author but removes the attribution information about the tip author when posting the newly created anonymous tip on the tip marketplace. Furthermore, the backend server system 570 implements user tools for tip and entity searches by all registered users, tip purchase initiation, tip generation/creation, etc.

In some embodiments, the tip purchase transaction database 595 is communicably connected to the backend server system 570 and is configured to store records of tip purchases linked to the purchasing users' user profiles (stored in the user profile database 552). In some embodiments, the tip purchase transaction database 595 is further configured to store values to distribute funds of purchased tips. In some embodiments, the distribution of funds for a purchased tip is calculated by the backend server system 570 based on the earnings split percentage configured for platform 555 and the tip price set by the tip author.

In some embodiments, the cloud-based monetized user feedback system 500 and platform 555 provide a single database (not shown in this figure) that is communicably connected to the backend server system 570 and is configured to store all of the information and data stored in the tip information database 580, the purchaser feedback (tracking) database 585, the tip marketplace database 590, the tip purchase transaction database 595, and the tip author reputation rankings database 597. In some embodiments, the single database may be a logic single database spread across multiple data storage (physical hardware) units. In some embodiments, the single database may be a cluster database, with each database 580-597 being a separate logical cluster of the overall cluster database for the cloud-based monetized user feedback system 500 and platform 555.

In some embodiments, the direct user communications system 599 is communicably connected to the backend server system 570 and is configured to establish direct communication channels between tip purchasers and authors who agree to direct messaging.

To use the monetized user feedback system of the present disclosure, the user goes to the cloud-network web service (e.g., via the website, web app, mobile app, etc.) and follows the steps on the web service to achieve the desired result. Tip authors provide tips, set prices, and get notified if open to direct communication and a purchaser seeks to communicate about a tip. Purchase view tips and provide feedback on each tip (to continue to be able to purchase tips). Purchasers may seek to communicate directly with tip authors who are willing to do so. Users may be tip authors and purchasers, as these designations are related to user interactions when connected to the cloud-network web service. Also, access by all users is the same; users must register, and users interact with the system, whether as tip authors or tip purchasers for any given interactions, via similar mechanisms (e.g., through the user interface as displayed on their mobile device, computing device, etc.).

Many of the above-described features and applications are implemented as software processes specified as instructions recorded on a computer-readable storage medium (also referred to as computer-readable medium or machine-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable press does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. Multiple software inventions can also be implemented as separate programs in some embodiments. Finally, any combination of separate programs that implement a software invention described here is within the scope of the invention. In some embodiments, the software programs, when installed to operate on one or more electronic systems, define one or more specific machine implementations that execute and perform the operations of the software programs.

Figure 6:
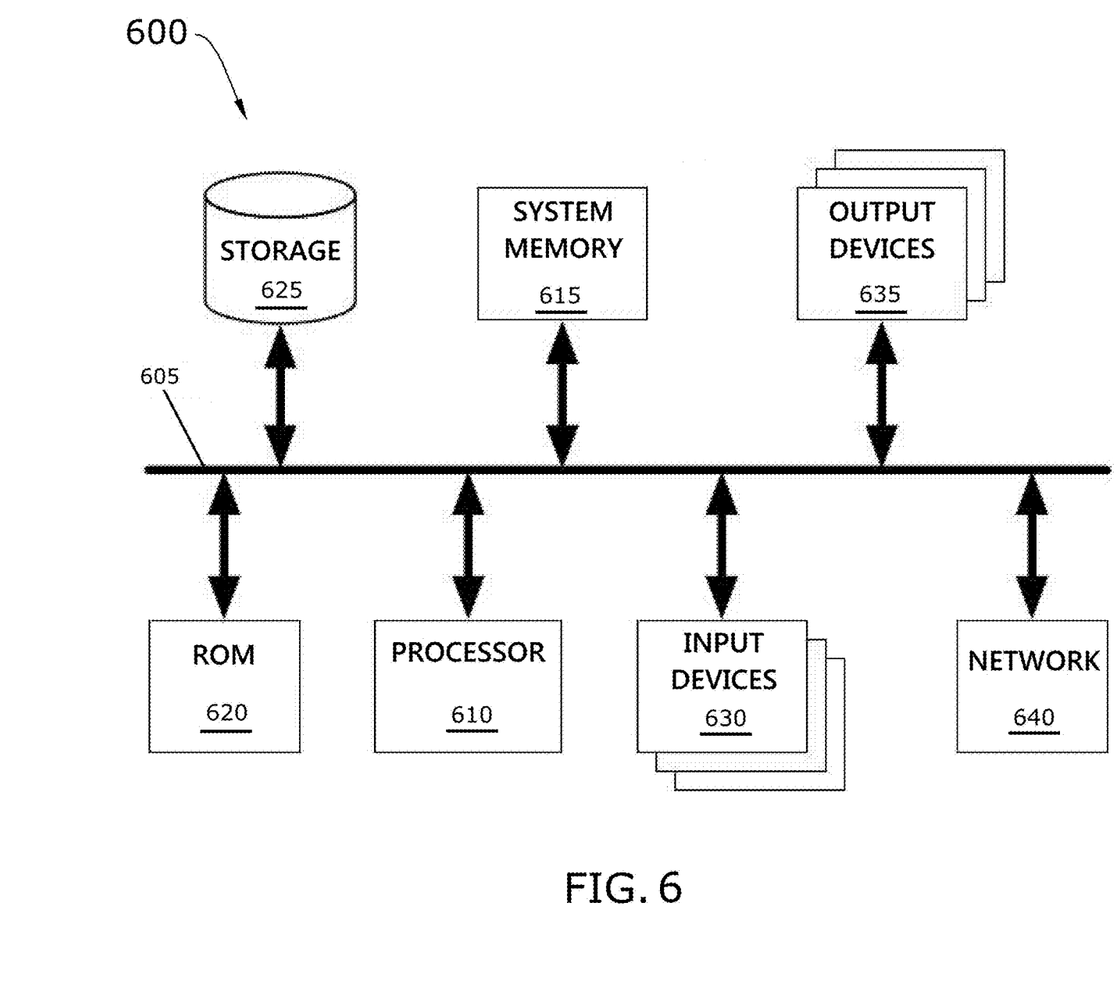
FIG. 6 conceptually illustrates an electronic system with which some embodiments of the invention are implemented.

FIG. 6 conceptually illustrates an electronic system 600 with some embodiments of the invention implemented. The electronic system 600 may be a computer, a laptop, a server, a single board computer (SBC), a cloud server, a mobile device, a smartphone, a personal digital assistant (PDA), a tablet computing device, or any other electronic device. Such an electronic system includes various types of computer-readable media and interfaces for multiple types of computer-readable media. Electronic system 600 includes a bus 605, processing unit(s) 610, a system memory 615, a read-only memory 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 connects the processing unit(s) 610 with the read-only memory 620, the system memory 615, and the permanent storage device 625.

The processing unit(s) 610 retrieves instructions and data from these various memory units to process and execute the invention's processes. In different embodiments, the processing unit(s) may be a single- or multi-core processor(s).

The read-only-memory (ROM) 620 stores static data and instructions needed by the processing unit(s) 610 and other modules of the electronic system. On the other hand, the permanent storage device 625 is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments may use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random-access memory. The system memory 615 stores some of the instructions and data the processor needs at runtime. In some embodiments, the invention's processes are stored in the system memory 615, the permanent storage device 625, and/or the read-only memory 620. For example, the various memory units include instructions for receiving information from a tip author, posting the tip to make available to potential purchasers, completing transactions for the purchase of said tip, and otherwise facilitating communication between authors and purchasers when both parties are interested in this. From these various memory units, the processing unit(s) 610 retrieves instructions and data to process to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 display images and textual information (for tips) based on user-provided input generated by the electronic system 600. The output devices 635 include printers and display devices, such as liquid crystal displays (LCD) and organic light emitting diode (OLED) displays. Some embodiments include a touchscreen that functions as an input and output device.

Finally, as shown in FIG. 6, bus 605 also couples electronic system 600 to network 640 through a network adapter (not shown). In this manner, the computing device or electronic system 600 can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, computer software, firmware, or hardware. The techniques can be implemented using one or more computer program products. Programmable processors and computers can be packaged or included in mobile devices. The processes and logic flows may be performed by one or more programmable processors and by sets of programmable logic circuitry. General and special-purpose computing and storage devices can be interconnected through communication networks.

Some embodiments include electronic components, such as microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid-state hard drives, read-only and recordable Blu-Ray® discs, ultra-density optical discs, any other optical or magnetic media, and floppy disks. The computer-readable media may store a computer program executable by at least one processing unit and includes instructions for performing various operations. Examples of computer programs or computer code include machine code, produced by a compiler, and files, including higher-level code, executed by a computer, an electronic component, or a microprocessor using an interpreter.

While the invention has been described with reference to numerous specific details, one of ordinary skill in the art will recognize that the monetized user feedback system and platform can be embodied in other specific forms without departing from the spirit of the invention. For instance, FIGS. 1-4 conceptually illustrate processes in which the specific operations of these processes may not be performed in the exact order shown and described. Specific operations may not be performed in one continuous series of operations, and different specific operations may be performed in different embodiments. Furthermore, the processes could be implemented using several sub-processes or as part of a larger macro process. In addition, the monetized user feedback system and platform can be adapted across various fields beyond its initial design for content sharing and engagement. For instance, adapting the monetized user feedback system and platform for educational platforms where it manages instructional content, with educators publishing materials and students accessing them, utilizing the reputation system to highlight effective resources. Similarly, the monetized user feedback system and platform can be adapted for professional networking sites, where the platform could support the exchange of industry insights and professional advice, enhancing networking through quality-based user interactions. The monetized user feedback system and platform can be adapted for use in digital goods marketplaces, tapping the reputation and transaction features of the monetized user feedback system and platform to facilitate secure buying and selling processes, building seller credibility. Crowd-sourcing platforms may also deploy the monetized user feedback system and platform for innovation and crowdsourcing, configuring to manage idea submissions and community feedback and identify valuable contributions through user ratings. Another adaptation would enable the monetized user feedback system and platform to be utilized by health and wellness applications, in which professionals share wellness tips, with the reputation system ensuring credible advice is promoted. Thus, one of ordinary skill in the art would understand that the invention is not to be limited by the foregoing illustrative details, but rather is to be defined by the appended claims.

I claim:

1. A tip author creation and submission and post-purchase communication and feedback method for creating and posting feedback on a tip marketplace comprising:

visually outputting, on a screen of a computing device operable by a user, a user interface (UI) comprising a tip search tool, wherein the UI is communicably connected to a tip marketplace;

utilizing the tip search tool to specify tip search criteria comprising tips associated with a particular subject and a particular entity;

searching for tips associated with the tip search criteria which are posted on the tip marketplace;

receiving, at the computing device and from a backend server system that hosts the tip marketplace, search results comprising a list of tips that are associated with the particular subject and the particular entity;

displaying the list of tips in the UI;

receiving a selection of a particular tip in the list of tips, wherein the particular tip is a tip created and posted by a tip author;

determining a type of the particular tip, wherein the type comprises one of a free tip type when the particular tip is free and a non-free tip type when the particular tip is not free;

proceeding to a set of tip processing operations when the type of the particular tip is the free tip type;

performing to a plurality of non-free tip processing operations when the type of the particular tip is the non-free type, wherein the plurality of non-free tip processing operations comprises:

visually outputting, when the type of the particular tip is the non-free tip type, a tip purchase tool in the UI on the screen, wherein the tip purchase tool is interactively operable by the user through the UI, wherein the tip purchase tool initiates a payment transaction to purchase the particular tip upon selection by the user;

automatically initiating, when the type of the particular tip is the non-free tip type and the tip purchase tool is selected through the UI, the payment transaction for a payment amount to pay for purchase of the particular tip;

distributing, to the tip author when the type of the particular tip is the non-free tip type and after the payment transaction is completed, a portion of the payment amount to purchase the particular tip, wherein the portion of the payment amount is based on an earnings split percentage configuration setting; and proceeding, when the type of the particular tip is the non-free tip type, to the set of tip processing operations after distributing the portion of the payment amount to the tip author; and performing the set of tip processing operations comprising (i) setting up a direct communication channel when the tip author and the user are open to direct messaging and (ii) gathering feedback about the particular tip purchased by the user.

2. The tip author creation and submission and post-purchase communication and feedback method of claim 1, wherein each listed tip in the list of particular tips is listed in the search results with a teaser description of the listed tip.

3. The tip author creation and submission and post-purchase communication and feedback method of claim 1, wherein the portion of the payment amount is distributed to a bank account of the tip author.

4. The tip author creation and submission and post-purchase communication and feedback method of claim 1, wherein gathering feedback about the particular tip purchased by the user comprises determining whether the user has provided feedback about the particular tip after purchase of the particular tip.

5. The tip author creation and submission and post-purchase communication and feedback method of claim 4 further comprising preventing the user from creating new tips and purchasing other tips posted in the tip marketplace until the user provides a quality rating feedback submission in connection with the tip content of the particular tip.

6. The tip author creation and submission and post-purchase communication and feedback method of claim 5, wherein the quality rating feedback submission comprises one of a positive quality rating feedback submission, a negative quality rating feedback submission, and a neutral quality rating feedback submission.

7. The tip author creation and submission and post-purchase communication and feedback method of claim 6, wherein gathering feedback about the particular tip purchased by the user is performed by a reputation ranking system.

8. The tip author creation and submission and post-purchase communication and feedback method of claim 1, wherein setting up the direct communication channel when the tip author and the user are open to direct messaging is performed by a direct user communications system.

9. The tip author creation and submission and post-purchase communication and feedback method of claim 1, wherein the particular tip remains posted in the tip marketplace for subsequent viewing and potential purchase by other registered users after the particular tip is purchased by the user.

10. The tip author creation and submission and post-purchase communication and feedback method of claim 1, wherein the particular tip is created and posted in the tip marketplace anonymously by the tip author.

11. The tip author creation and submission and post-purchase communication and feedback method of claim 1, wherein the particular tip is created and posted in the tip marketplace with self-attribution by the tip author.

12. The tip author creation and submission and post-purchase communication and feedback method of claim 1, wherein the tip created and posted by the tip author is associated with a particular topic created through a topic management system that automatically generates channels for the particular topic.

13. The tip author creation and submission and post-purchase communication and feedback method of claim 1, wherein tips posted on the tip marketplace are organized for display by a content ranking system and visibility manager.

* * * * *